United States Patent [19]

Steck

[11] 3,785,604
[45] Jan. 15, 1974

[54] SUPPORT BRACKET FOR LANTERNS AND THE LIKE

[76] Inventor: Edward James Steck, 9017 Laurel Crest Dr., Crestwood, Mo. 63126

[22] Filed: Jan. 21, 1972

[21] Appl. No.: 219,659

[52] U.S. Cl. .............................................. 248/231
[51] Int. Cl. ......................................... F16m 13/02
[58] Field of Search .................. 248/121, 166, 231, 248/240.3, 240.4, 242, 293, 294, 309, 311

[56] References Cited
UNITED STATES PATENTS

| | | | |
|---|---|---|---|
| 1,712,974 | 5/1929 | Venard | 248/231 X |
| 2,975,999 | 3/1961 | Bunch | 248/121 |
| 498,816 | 6/1893 | Ross | 248/231 |
| 873,446 | 12/1907 | Manheim | 248/293 X |
| 2,472,752 | 6/1949 | Mackereth | 248/221 X |
| 3,612,460 | 10/1971 | Smith | 248/221 |
| 2,142,830 | 1/1939 | Wendell | 248/293 X |

Primary Examiner—William H. Schultz
Attorney—F. Travers Burgess et al.

[57] ABSTRACT

A support bracket device for lanterns and the like consists of an elongated abutment arm, a support arm pivoted thereto and rotatable from a storage position aligned with said abutment arm to an operative position generally perpendicular to the abutment arm, and a strap secured to said abutment arm at a right angle therewith and adapted to encircle a tree or the like for securing the abutment arm in aligned abutting relation with the tree or other upright columnar member.

7 Claims, 6 Drawing Figures

PATENTED JAN 15 1974  3,785,604
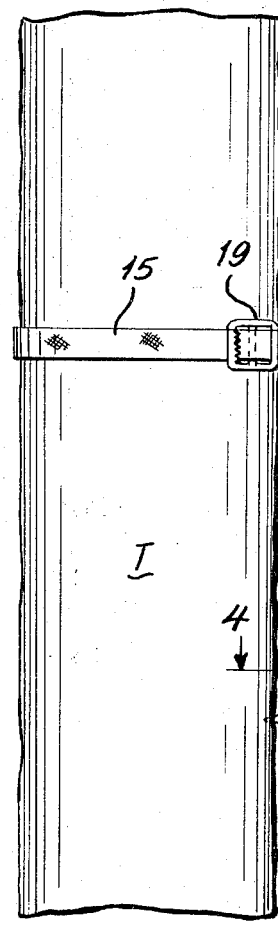
FIG.1
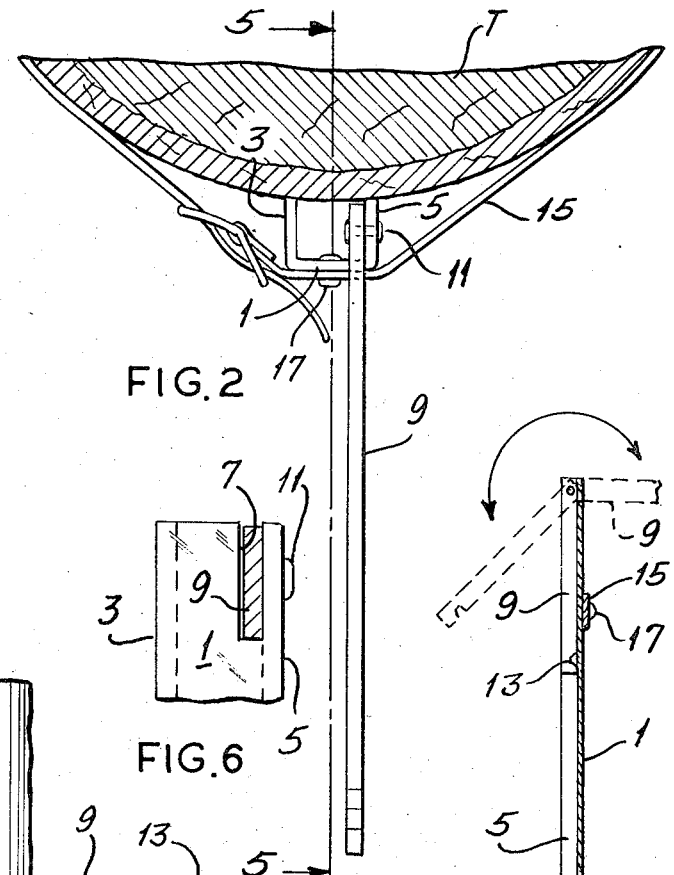
FIG.2
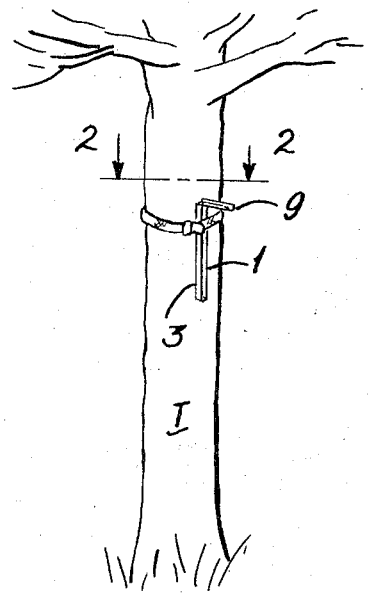
FIG.6
FIG.5
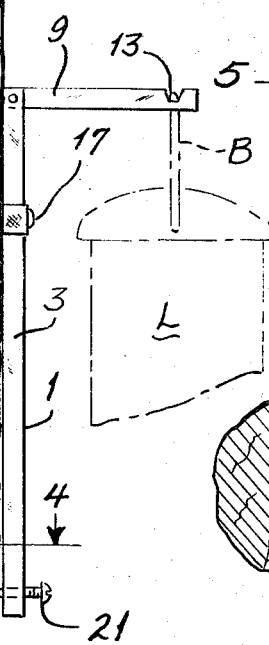
FIG.3
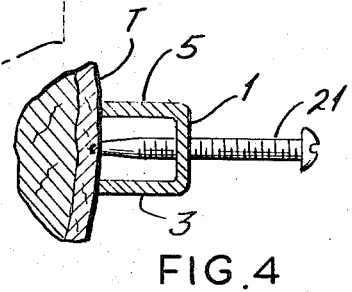
FIG.4

SUPPORT BRACKET FOR LANTERNS AND THE LIKE

BACKGROUND OF THE INVENTION

1. Field of the Invention

The invention relates to a supporting device particularly adapted for supporting lanterns on trees and the like.

2. The Prior Art

Commonly, on camp grounds and at similar locations, lanterns are supported on trees by the simple expedient of driving nails into the tree trunks and hanging the bails of the lanterns on the protruding portion of the nails. This may damage the trees and frequently causes them to die.

SUMMARY OF THE INVENTION

The invention provides a simple, inexpensive support for lanterns and the like from trees or other upright columnar members which will not damage the tree, but will provide a strong, stable support for heavy lanters or similar articles. An object of the invention is to provide a support device which can be folded to a storage position requiring a minimum of storage space. A further object is to provide a support device which will provide a strong, stable support for heavy objects. An additional object is to provide a support device which can be erected and attached by anyone with a minimum of effort.

BRIEF DESCRIPTION OF THE DRAWINGS

FIG. 1 is a perspective view of the support device applied to a tree.

FIG. 2 is a top view of the device in its operative position.

FIG. 3 is a side elevational view of the device in operative position.

FIG. 4 is a horizontal sectional view along line 4—4 of FIG. 3.

FIG. 5 is a vertical sectional view of the device along line 5—5 of FIG. 2.

FIG. 6 is an enlarged fragmentary front elevational view partially sectionalized of the upper portion of the device.

DESCRIPTION OF THE PREFERRED EMBODIMENT

The support bracket comprises an elongated channel section abutment arm having a web 1 and flanges 3 and 5. At its upper end, web 1 is provided with an upwardly open axial slot 7, preferably having one edge flush with the inner surface of flange 5 and a support arm 9, preferably a bar of rectangular cross section, is pivotally secured against the inner surface of flange 5 by a rivet 11 such that arm 9 can be rotated from a storage position wholly within the channel defined by web 1 and flanges 3 and 5 (FIG. 5) to a perpendicular operating position as shown in FIGS. 1-3 in which the lower edge of arm 9 rests on the bottom of slot 7. At its outer end, the upper surface of arm 9 is formed with a notch 13 to receive the bail B of a lantern L or similar article.

For securing the device to a tree or the like, a belt or strap 15 is secured by a rivet to the upper portion of web 1 of the abutment arm, and is provided with a suitable adjustment buckle 19 for tightening it around a tree trunk T with abutment arm 1, 3, 5 vertical, that is, parallel to the axis of the tree trunk.

Preferably abutment arm 1, 3, 5 is substantially longer than support arm 9 and that portion of the abutment arm below strap 15 is substantially longer than the portion above the strap to provide a long moment arm resisting tendencies of the lantern or other load on bracket 9 to tip the entire bracket device.

At some point along its length, web 1 may be threaded to receive a screw 21, the inner end of which is pointed to permit its penetration of the outer layers of the tree bark and thus cooperate with strap 15 to steady the abutment arm in its upright operating position.

When the device is not in use, support arm 9 may be swung about rivet 11 to the position shown in FIG. 5 and strap 15 wrapped tightly around arm 1, 3, 5 to secure arm 9 within the abutment arm channel.

The details of the device may be modified substantially without departing from the spirit of the invention and the exclusive use of any modifications as come within the scope of the appended claims is contemplated.

I claim:

1. A support bracket device comprising an elongated abutment member, a support arm pivotally secured to the upper end thereof on an axis transverse of said abutment member for movement between a storage position aligned with said abutment member and an operating position disaligned from said abutment member, and an adjustable strap on the upper portion of said abutment member and elongated generally perpendicular thereto for securing said abutment member in aligned abutting relation with a tree trunk or the like, said abutment member being of channel cross section having a web and a flange and said support arm being pivoted to said flange within said channel, said web being formed at its inner end with an upwardly open axial slot, said support arm being adapted to project through said slot and rest on the bottom thereof when extended, one vertical edge of said slot being substantially flush with the inner surface of said flange, said support arm being secured substantially against said flange.

2. A support bracket device according to claim 1 wherein said abutment member is of channel cross section and said support arm is pivotally secured within the channel.

3. A support bracket device according to claim 2 wherein said abutment member has a web and a flange and said support arm is pivoted to said flange.

4. A support bracket device according to claim 3 wherein said web is formed at its inner end with an upwardly open axial slot and said support arm is adapted to project through said slot and rest on the bottom thereof when extended.

5. A support bracket device according to claim 1 wherein said support arm is a flat bar with a notch in its upper surface outwardly of said pivot for receiving the bail of a lantern or the like.

6. A support bracket device according to claim 5 wherein said strap is secured to said web and has an adjustable buckle for tightening it about a tree trunk or the like.

7. A support bracket device according to claim 6 wherein a screw passes through said web with its point inwardly thereof for light penetration of the outer layers of bark or outer surface of a tree trunk or the like.

* * * * *